United States Patent [19]

Kidder et al.

[11] Patent Number: 4,949,813
[45] Date of Patent: Aug. 21, 1990

[54] LUBRICATION/COOLANT DELIVERY SYSTEM

[76] Inventors: Paul R. Kidder; Ronnie J. Kidder, both of 307-A Leonie St., Lafayette, La. 70506

[21] Appl. No.: 455,811

[22] Filed: Dec. 21, 1989

Related U.S. Application Data

[63] Continuation of Ser. No. 311,528, Feb. 15, 1989, abandoned.

[51] Int. Cl.$^5$ .................. B23G 1/00; B23B 51/06; B27C 9/00
[52] U.S. Cl. ................................ 184/6.14; 10/106; 408/56
[58] Field of Search .................. 184/6.14; 10/106; 408/56, 61; 29/DIG. 67

[56] References Cited

U.S. PATENT DOCUMENTS

| | | | |
|---|---|---|---|
| 2,692,996 | 11/1954 | Wallace | 10/106 |
| 2,916,749 | 12/1959 | Ingwer et al. | 184/6.14 X |
| 3,176,330 | 4/1965 | Jennings | 10/106 |

*Primary Examiner*—Allen M. Ostrager
*Attorney, Agent, or Firm*—Pravel, Gambrell, Hewitt, Kimball & Krieger

[57] ABSTRACT

An apparatus securable onto a machine for tooling stationary parts, which provides a lubrication/coolant delivery system externally mountable upon a tool holder, of the type having a rotatable die head with a plurality of dies for machining the stationary part. The apparatus comprising a first internal ring member engaged to the tool holder for allowing rotation of the ring as the holder rotates, the internal ring further defining an annular channel for receiving lubricant/coolant thereinto; a pair of outer rings, for defining an exterior stationary housing surrounding the internal ring and defining a means for sealing the annular channel containing lubricant/coolant therewithin; a plurality of nozzles in fluid communication with the annular channel of the inner ring, each of the nozzles protruding out of the face of the inner ring, and extending downward to a position in relation to the rotation of each of the dies mounted on the rotating tool head, for providing a continuous and uninterrupted source of lubricant/coolant between lubricant/coolant pumped into the annular channel of the inner ring, and flowing out of the nozzles directed at the plurality of contact points between the plurality of dies and the work piece being machined. There is further provided a means for sealingly maintaining the lubricant/coolant within the annular channel, and means for providing easy rotation of the inner ring in relation to the stationary outer rings.

7 Claims, 3 Drawing Sheets

LUBRICATION/COOLANT DELIVERY SYSTEM

This is a continuation of co-pending application Ser. No. 07/311,528 filed on Feb. 15, 1989 now abandoned.

BACKGROUND OF THE INVENTION

1. Field of the Invention

The apparatus and system of the present invention relates to lubricating or cooling a work piece in a metal removal process. More particularly, the present invention relates to a system for delivering lubrication or coolant fluids to a stationary part which is being machined by rotating tools, in a continuous and uninterrupted manner.

2. General Background

In the art of machines utilized for pipe threading, cutting, reaming, or other machine parts, the part to be machined, or pipe threaded would be maintained stationary within a set of jaws while a spindle rotatable mounted on the machine, the spindle having a plurality of blade members substantially equally spaced around the face of the spindle, in order to cut into the piece being machined and formed, for example, the threads on the end of the pipe. During this operation, it is imperative that the contact between the rotating blades and the piece being machined, be continuously and completely lubricated and cooled, so that the blades of the work piece are not damaged due to overheating.

In the present state of the art, this cooling or lubricating is achieved by feeding a stream of lubricants such as sulphur based oil or the like into the area in which the blades are making contact with the work piece, usually via a single lubricant nozzle, on a flexible stem, pouring lubricant oil onto the blades, the oil being continuously pumped through the nozzle during the cutting process.

However, one of the shortcomings of this particular method of lubrication, is due to the fact that as the blades, which are mounted on the face of the spindle, are rotating around the central axis of the work piece, the flow of oil is interrupted as each blade circulates through the stream of oil, thus, for a split second interrupting a flow of lubricant to the work piece. However, due to the fact that this interruption is done on a continuous and closely spaced integrals, the amount of lubricant which is available for the contact surface between the work piece and the blades is greatly diminished, and therefore the work piece and blades overheat, causing damage to the system.

An additional shortcoming with the use of oil is the limitation in RPM at which the party worked. Water soluable oils and synthetics are capable of a minimum increase of 100% in RPM.

Therefore, it is desirable in the industry that a system be devised which would solve the problem of providing a continuous and uninterrupted and stream of lubricant or coolant to the blade and work piece contact points, during machining of the work piece, in order to increase the life of the blades, and in order to achieve a more finely tooled work piece at a substantially higher production rate.

Further, it is desirable that a system be devised which could utilize a coolant that can either be a lubricant or a non-lubricant. For example, such lubricants as sulphur based oils, and water based oils, may be utilized, or a water based chemically activated synthetic to be utilized as a non-lubricant in the system.

There are several patents which address lubrication for pipe cutting or threading machines or the like, the most pertinent being as follows:

U.S. Pat. No. 1,566,700, issued to Schmelz, entitled "Pipe Threading And Cutting Off Machine", relates to a pipe threading machine in which a work piece is held stationary while the threading die are revolved around it. Particularly, the machine which is able to deliver a flow of lubricant to the front of each of the dies through four individual channels in order to lubricate the machine during operation. Furthermore, this apparatus allows only for the use of oils since oil is utilized for both the transmission lubricant and threading lubricant, therefore no water soluable lubricant is provided for.

U.S. Pat. No. 2,614,435, issued to Chasar, entitled "Machine Tool" relates to a machine which a spindle and driving mechanism are compactly housed and which due to the affordability, can be easily assembly and disassembled. This apparatus utilizes a stationary oiler.

U.S. Pat. No. 3,162,872, issued to Adelman, entitled "Automatic Oil For Manually Actuated Pipe Threading Tool", provides an automatic oil or attachment that can be secured to a manual threading machine to automatically deliver oil upon the pipe or stock piece threaded. It is not possible to use a water base lubricant or synthetic with this unit since the RPM of the apparatus are not high enough to activate the catalyst in the coolant.

The remainder of the patents are pertinent to the art of machine tools and the lubrication, thereof which utilize stationary oilers:

| U.S. Pat. No.: | INVENTOR: | TITLE: |
| --- | --- | --- |
| 3,332,095 | Ivester | "Pipe Working Tool Assembly" |
| 3,537,341 | Zahuranec | "Cutting Tool" |
| 1,758,973 | Rasmussen | "Pipe Threading Machine" |
| 2,692,996 | Wallace | "Lubrication Means For Pipe-Cutting And Threading Machines" |
| 2,916,749 | Ingwer | "Power Threading Tool Having Lubrication Means For The Tool Carriage And The Die Head Cutters" |

SUMMARY OF THE PRESENT INVENTION

The system of the present invention solves the problems confronted in the art of lubricanting and/or cooling a work piece during machining in a straight forward manner. What is provided is an apparatus securable onto a machine for tooling stationary parts, which provides a lubrication/coolant delivery system externally mountable upon a tool holder, of the type having a rotatable die head with a plurality of die for machining the stationary part. The apparatus comprising a first internal ring member boltingly engaged to the tool holder for allowing rotation of the ring as the holder rotates, the internal ring further defining an annular channel for receiving lubricant/coolant thereinto; a pair of outer rings, for defining an exterior stationary housing surrounding the internal ring and defining a means for sealing the annular channel containing lubricant/coolant therewithin; a plurality of nozzles in fluid communication with the annular channel of the inner ring, each of the nozzles protruding out of the face of the inner ring, and extending downward to a position in relation to the rotation of each of the dies mounted on the rotating tool head, for providing a continuous source of lubricant/coolant between lubricant/coolant pumped into the annular channel of the inner ring, and flowing out of the nozzles directed at the plurality of contact points between the plurality of dies and the work piece being machined. There is further provided a means for sealingly maintaining the lubricant/coolant within the annular channel, and means for providing easy rotation of the inner ring in relation to the stationary outer rings.

Therefore it is a principal object of the present invention to provide a system for lubricant/coolant a stationary work piece being machined by a rotating tool head, by providing continuous uninterrupted flow of lubricant or coolant to all contact points between the work piece and the die;

It is a further object of the present invention to provide a system for maintaining a continuous flow of water soluable coolant to a work piece being machined by a rotating die head, so that there is no interruption between the flow of coolant onto the surface of the work piece being machined;

It is still a further object of the present invention to provide a system for lubricating/cooling a stationary work piece being machined by a rotating die head, which is portable and may be mounted on an existing cutting machine, and solves the problem of complete lubrication/coolant of the work piece during machining; and It is a further object of the present invention to provide a system for lubricating/cooling die head comprising a plurality of nozzles affixed to the rotating tool head, each of the nozzles receiving a continuous flow of lubricant/coolant therethrough for lubrication/coolant of the work piece being machined.

These and other objects of this invention will be readily apparent to those skilled in the art from the detailed description and claims which follow.

BRIEF DESCRIPTION OF THE DRAWINGS

For a further understanding of the nature and objects of the present invention, reference should be made to the following detailed description, taken in conjunction with the accompanying drawings, in which like parts are given like reference numerals, and wherein.

DETAILED DESCRIPTION OF THE PREFERRED EMBODIMENT

Figure 1:
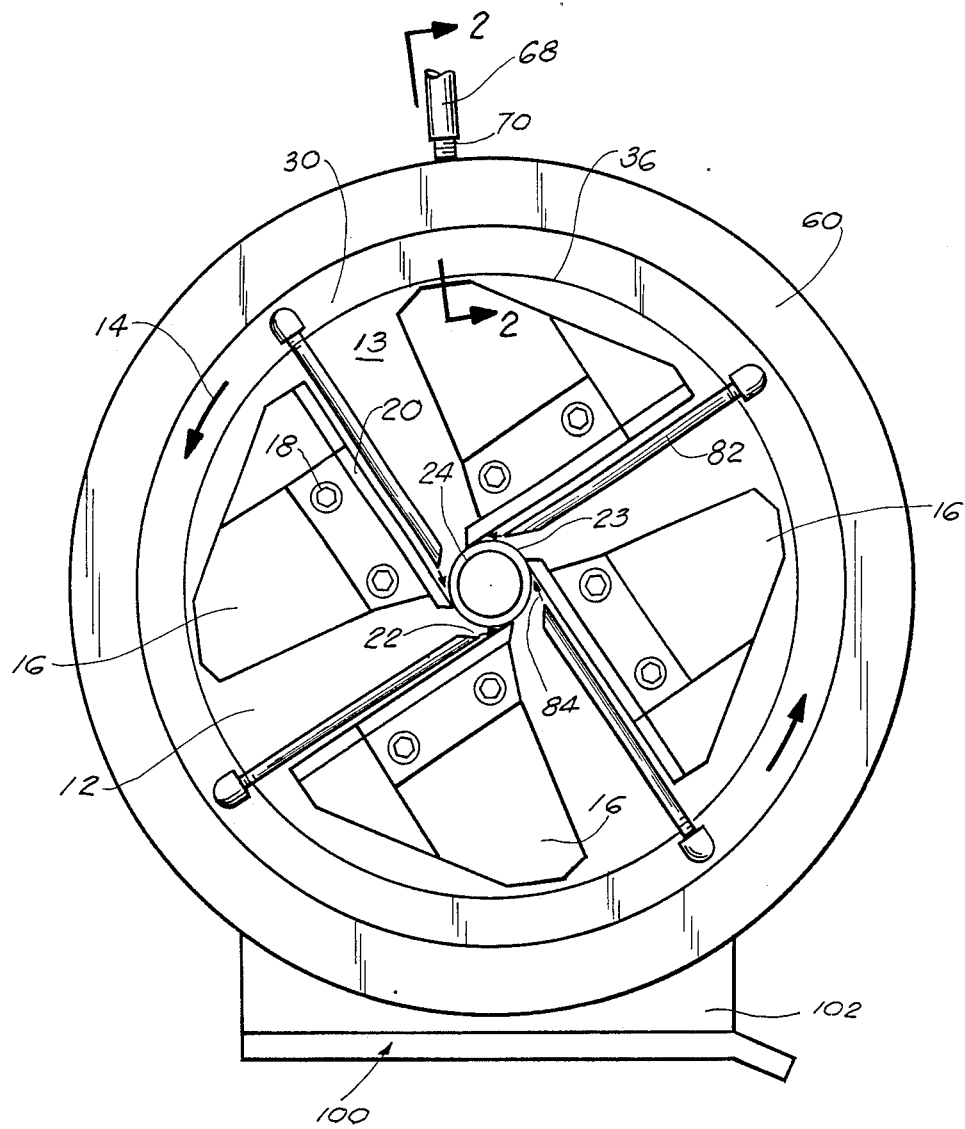
FIG. 1 illustrates a front view of the preferred embodiment of the system of the present invention mounted on a rotating die head.

The system of the present invention is illustrated in FIGS. 1–4. As illustrated in FIG. 1, there is provided a die head 12 which is a standard die head which rotates via a source of power, such as a motor (not illustrated), in the direction of Arrows 14, with the die head 12 being provided with a plurality of tool holder 16, each of the tool holder 16 mounted onto the face 13 of die head 12 via mounting screws 18. Each of the die 16 would further comprise a cutting blade portion 20, the cutting blade portion having cutting teeth 22 at the distanl ends thereof. As illustrated, each of the blades 20 are making cutting contact with the surface 23 of a circular work piece 24, such as a length of pipe, with the teeth 22 forming, for example, a series of threads in the wall of pipe 24, as the blades 20 are rotated with the rotation of die head 12, and forming a tangential cutting relationship between the surface 23 of the work piece 24 and the teeth 22 of blades 20. Such an arrangement of a plurality of cutting blades equally spaced around the surface of the work piece in rotatingly fashion it is quite common in the art, and is not part of the present invention.

Figure 2:
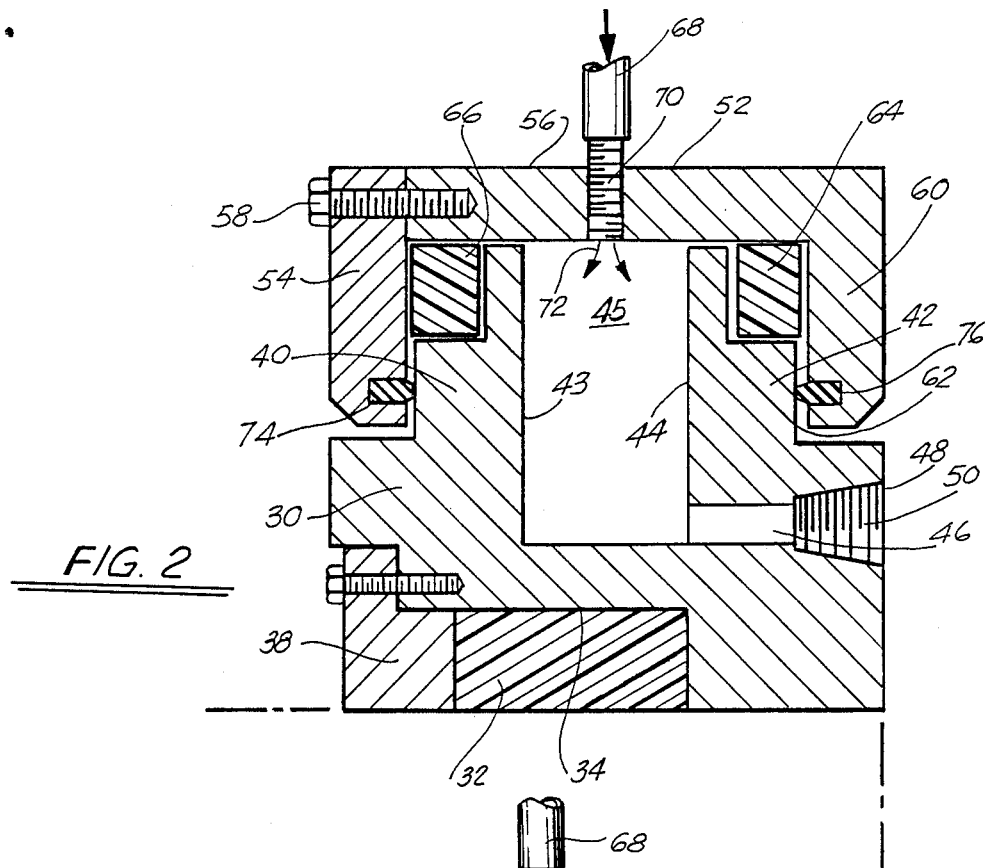
FIG. 2 represents a cross-sectional view along lines 2—2 in FIG. 1 of the preferred embodiment of the system of the present invention.

Turning now to the present invention, the present invention would provide a means for continuously lubricating/cooling work piece 24 in the manner which would provide an uninterrupted flow of lubricant/coolant to the surface 23 of work piece 24. This system, as illustrated, particularly in FIGS. 2 and 4, would provide a first interior annular member 20, with annular member 30 having initially a central bore 32, which would be of substantially the diameter of the die head 12, slidingly engaged around die head 12, and be mounted thereupon. for purposes of functioning, annular member 30 would rotate together with the rotation of die head 12 during use. Therefore, there is provided a compressible member 33 mounted between an inner wall 34 and the exterior annular wall 36 of die head 12, so that the wall 36 of the die head 12 would frictionally accommodate annular member 30 and allow it to rotate therewith. In order to more fixedly secure annular member 30 onto the surface of die head 12, there is provided a rear mounted outer ring 38 which when tightened thereunto would compress member 32 and affix annular member 30 onto the outer wall of rotating die head 12. The assembled unit, as illustrated in FIGS. 1 and 2 would be held in place on die head 12 via a mounting bracket 100, which includes a mounting plate 102 secured to the lower surface of the annular wall of the apparatus, in order to position it properly on die head 12.

Turning now to the further structure of annular member 30, annular member 30 would include a rear face 40, and a front face portion 42, the rear face 40 and front face portion 42 spaced apart so that their inner walls 43 and 44 respectively would define an annular channel 45, the function of which will be described further. Further, the front face 42 of member 30 would include a plurality, in the preferred embodiment 4, ports 46 extending from the annular channel 45 through the front face 42 of member 30 for defining a means for fluid communication between annular channel 45 and the outer face 48 of member 30. For purposes of structure, the front portion of each port 46 would have a threaded portion 50, the function of which will be described further.

As further illustrated in the drawings, rotating annular member 30, which rotates in unison with the die head 12, would be enclosed in an annular housing 52. Annular housing 52 would be comprised of a rear stationary mounting plate 54 which would be boltingly engaged to an annular outer plate 56, around its circumference via bolts 58, with plates 56 having a forward downward depending lip portion 60, which would be affixed onto a shoulder 62 of member 30, so that member 30 is engaged between rear plate 54 and lip 60 and plate 54 and plate 56 are boltingly engaged thereto, as illustrated in FIG. 2. Since housing 52, as defined by plate members 54, 56 is stationary, and member 30 is rotatably, there would be provided a pair of bearing surfaces 64 and 66 between the member 30 and housing 52, so that member 30 would rotate with relative ease while member 52 maintains stationary.

Figure 3:
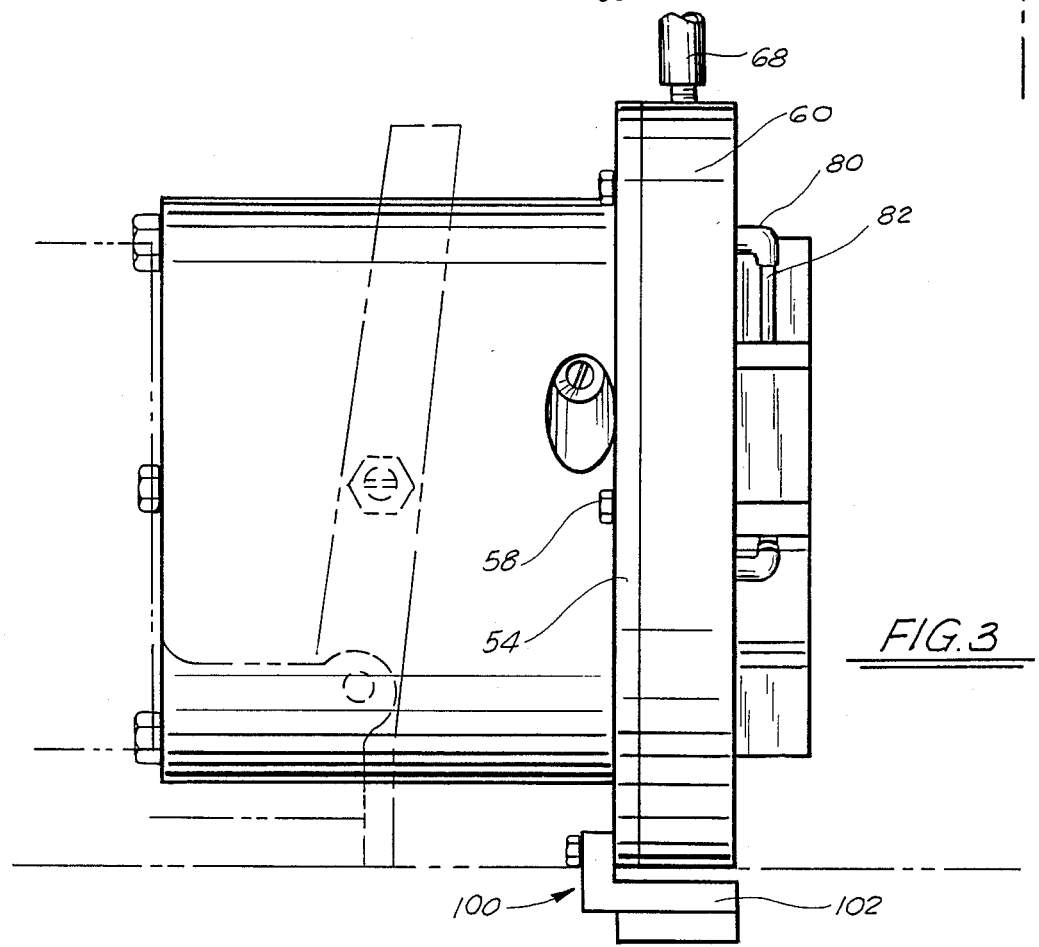
FIG. 3 illustrates a side view of the preferred embodiment of the system of the present invention mounted on a standard cutting machine.
Figure 4:
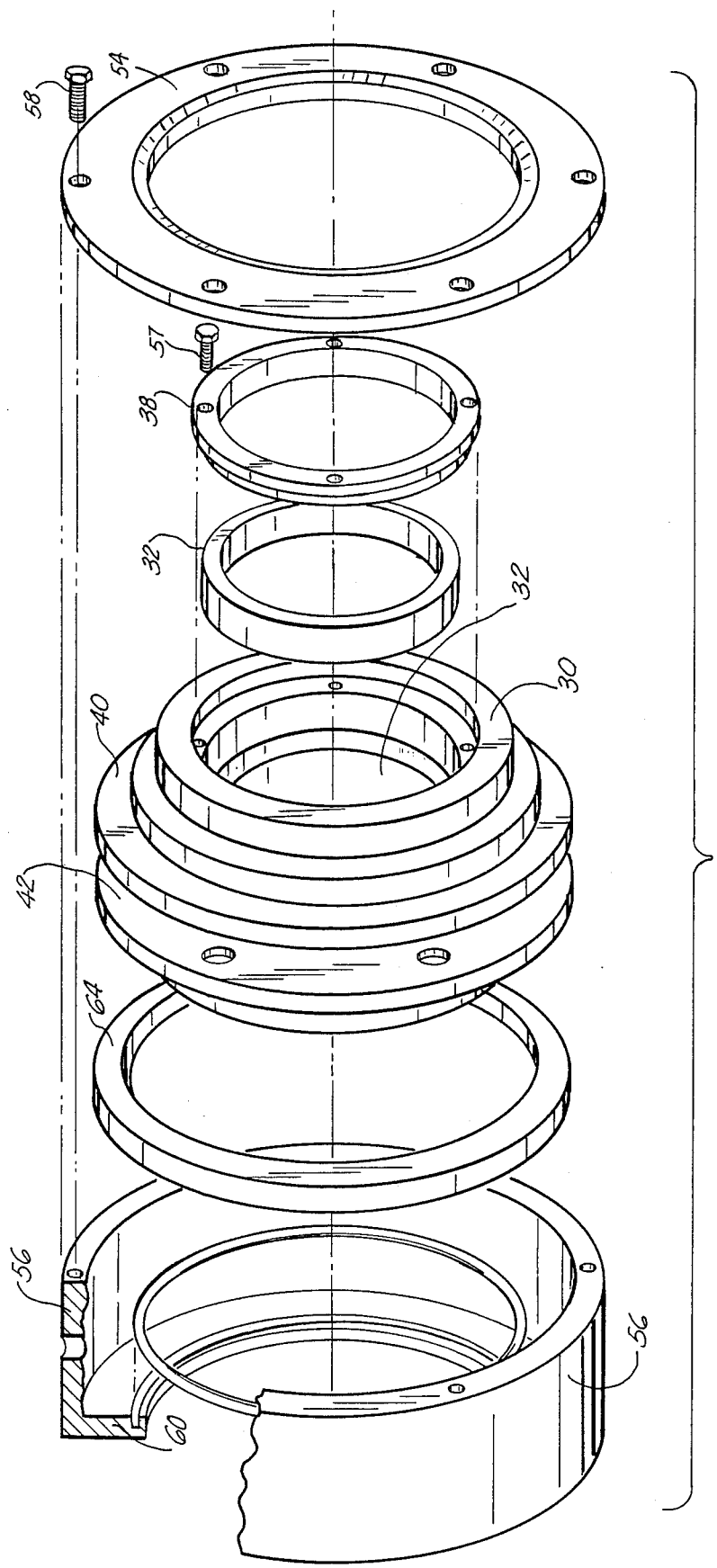
FIG. 4 illustrates an exploded view of the preferred embodiment of the system of the present invention mountable on a rotating die head.

Turning now to the function of rotating member 30, in relation to housing 52, reference again is made to channel 45. For purposes of use, channel 45 would define a annular channel for receiving fluid, such as lubricant in the form of oil or water based coolant, during use of the apparatus. As seen in FIGS. 2 and 3, the coolant would be provided into annular channel 45 via a hose 68, threaded via a nozzle 70 into the wall of housing 52, for delivering fluid into channel 45 in the direction of Arrows 72. Since channel 45 would contain a constant flow of fluid therein, the engagement between housing 52 and member 30 would further include a pair of front and rear O-rings 74 and 76 respectively, which would serve to prevent fluid contained within channel 45 from flowing outside of channel 45 other than through transport 46 as will be described.

Turning now to FIG. 2, each of the threaded ports 50 as was described earlier would transport 46, would accommodate a threaded nozzle 80, a threaded member 80 threadably engaged within threaded port 50, on its first end, and having an extended nozzle member 82 which may be threadably engaged into its second end, or be a quick release nozzle, so that fluid flowing within channel 45 could flow through port 46, into each nozzle 82 as illustrated in FIG. 1, and would deliver fluid in the direction of Arrows 84 at each point of contact between each blade member and work piece 24 as illustrated in FIG. 1. Therefore, as illustrated in view of the fact that each of the nozzles 82 are mounted onto rotating member 30, and rotating member 30 rotates in unison with die head 12, therefore, each of the nozzles 82 are rotating together with each of the blade members 20, and likewise are delivering the continuous uninterrupted flow of fluid between the surface 23 of work piece 24 and each blade 22 during operation of the apparatus. As is illustrated, it is critical that the fluid flow 84 be directed at that point of contact between directly ahead of the preceeding blade 20, so that the surface 23 is fully lubricated/cooled prior to the teeth 22 of the next blade 20 making cutting contact with the surface 23 of member 24. In this manner, the temperature of the work piece is maintained quite low, and very little friction and heat accumulates.

For purposes of use, the type of lubricant that would be utilized as was stated eariler, may be an oil based lubricant such as oil or the like, or a water based lubricant/coolant, which would not be harmful to the environment. Due to the fact that a great quantity of fluid can be provided through the plurality of nozzles, and that fluid flow is uninterrupted by the rotation of the blades as is found in the present state of the art, the water based fluid can maintain the work piece quite cool, and with no problem of overheating. Also of great importance, due to the use of the water base fluid, as a coolant, the surface of the work piece is more finely finished, and therefore, one is able to achieve a finer cut than would be with the oil base lubricant.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A system for delivering a fluid to a stationary work piece, which is being machined by a plurality of rotating blade members making contact with the outer surface of the work piece, the system comprising:
    (a) a first annular member removably mounted on the outer annular wall of the die head, and rotating therewith;
    (b) means positioned between the annular member and a wall of the die head in order to provide frictional engagement between the annular member and the die head for achieving rotation of the member as the die head is rotated;
    (c) an annular channel formed in the body of the member mounted on the die head;
    (d) a plurality of nozzle members, extending from the base of the rotatable member, and downward to the point of contact between teeth of each of the blade members, and the work piece being machined, each of the nozles in fluid communication with the annular channel, and providing fluid flow between the annular channel and the end of each of the nozzle members; and
    (e) means for supplying the annular channel with a continuous flow of the fluid, so that as the blade members are rotated, the nozzle members are rotated therewith, and provide continuous flow of fluid to the work piece at that point between the rotating blades making contact with the work piece, in order to lubricate or cool the work piece.

2. The apparatus in claim 1, wherein there is further provided an exterior housing around the annular channel for preventing fluid contained within the channel from flowing out of the channel other than through the plurality of nozzle member.

3. The apparatus in claim 1, wherein the fluid contained within the annular channel contains a water base lubricating or cooling fluid.

4. The apparatus in claim 1, wherein there is further provided a compressible member between the annular member and the wall of the die head in order to provide functional engagement between the annular member and the die head for achieving rotation of the member as the die head is rotated.

5. The apparatus in claim 1, wherein the exterior housing around the rotation member is stationary as the member rotates.

6. The apparatus in claim 1, wherein there is further provided bearing means for providing a sliding surface between the rotating member and the inner wall of the housing surrounding the rotating member.

7. An apparatus for lubricating or cooling a work piece held stationary within a rotating die head, the die head machining the work piece via a plurality of equally spaced apart blade members, the apparaus comprising:
    (a) an annular member, having a bore therethrough, for slidingly positioning the annular member around the die head, and frictionally engaging thereinto;
    (b) an annular channel formed in the annular member, the annular channel receiving a quantity of water based lubricating thereinto;
    (c) a stationary housing formed around the rotating member, for providing a seal between the annular channel formed in the annular member, and the wall of the housing;

(d) a plurality of ports, extending from the annular channel outward, each of the ports provided with a nozzle member, for receiving fluid flow from the annular channel into the nozzle member;

(e) means for providing fluid flow onto the work piece and each point of the work piece directly ahead of the next cutting blade, so that as the die head and the annular member is rotated, the plurality of nozzles are likewise rotated, and provide the flow of lubricant or coolant necessary to achieve a continuous, non-interrupted flow of lubricant or coolant onto the work piece during machining of the work piece.

* * * * *